US008833216B2

(12) United States Patent

Carew et al.

(10) Patent No.: US 8,833,216 B2

(45) Date of Patent: Sep. 16, 2014

(54) METHOD AND AN APPARATUS FOR PERFORATING POLYMERIC FILM

(75) Inventors: David Lee Carew, St Albans (AU); Erol Craig Harvey, Ringwood North (AU); Jasson Lindsay Mills, Preston (AU); Ramon Glenny Waycott, Donvale (AU); Richard Leigh Barber, Wantirna (AU); William Howard Barling, Preston (AU)

(73) Assignee: Amcor Limited, Hawthorn, VIC (AU)

( * ) Notice: Subject to any disclaimer, the term of this patent is extended or adjusted under 35 U.S.C. 154(b) by 394 days.

(21) Appl. No.: 12/538,844

(22) Filed: Aug. 10, 2009

(65) Prior Publication Data

US 2011/0030528 A1 Feb. 10, 2011

(51) Int. Cl.

| | |
|---|---|
| ***B26D 3/08*** | (2006.01) |
| ***B26F 1/14*** | (2006.01) |
| ***A01J 21/00*** | (2006.01) |
| ***B21D 13/00*** | (2006.01) |
| ***B26F 1/24*** | (2006.01) |

(52) U.S. Cl.

CPC .... *B26F 1/24* (2013.01); *B26F 1/14* (2013.01)

USPC .................. 83/13; 83/879; 83/684; 425/363; 72/185

(58) Field of Classification Search

USPC ............ 83/879, 880, 30, 168, 684–690, 660; 425/290, 363, 369, 371, 373, 374; 72/185–186, 196–198, 325, 324

See application file for complete search history.

(56) References Cited

U.S. PATENT DOCUMENTS

| | | | | | |
|---|---|---|---|---|---|
| 3,085,608 | A | | 4/1963 | Mathues | |
| 3,097,787 | A | | 7/1963 | Schur | |
| RE27,453 | E | * | 8/1972 | Schutte | 162/117 |
| 3,682,028 | A | | 8/1972 | Clayton | |
| T920,017 | I4 | * | 3/1974 | Billinghurst | 83/16 |
| 3,812,002 | A | | 5/1974 | Lurie | |
| 3,872,194 | A | | 3/1975 | Lowry et al. | |
| 3,881,489 | A | | 5/1975 | Hartwell | |
| 3,911,187 | A | * | 10/1975 | Raley | 428/180 |
| 4,211,743 | A | | 7/1980 | Kos et al. | |
| 4,319,868 | A | | 3/1982 | Riemersma et al. | |
| 4,323,068 | A | * | 4/1982 | Aziz | 604/370 |
| 4,397,902 | A | * | 8/1983 | Resch | 428/119 |

(Continued)

FOREIGN PATENT DOCUMENTS

| | | |
|---|---|---|
| EP | 0718088 A2 | 6/1996 |
| EP | 0881025 A1 | 12/1998 |

(Continued)

OTHER PUBLICATIONS

International Search Report, PCT/AU01/01503, dated Feb. 2, 2002.

*Primary Examiner* — Ghassem Alie

*Assistant Examiner* — Bharat C Patel

(74) *Attorney, Agent, or Firm* — Nixon Peabody LLP

(57) ABSTRACT

A tool for perforating a polymeric film is disclosed having a support substrate and at least one projection extending from the substrate. The projection is multi-sided with side walls that have straight sides that are tapered upwardly and inwardly from the support substrate at an angle theta (θ) that is at least 5°. The angle is measured in relation to imaginary lines extending perpendicularly to the substrate at the locations at which the side walls contact the substrate.

17 Claims, 7 Drawing Sheets

(56) References Cited

U.S. PATENT DOCUMENTS

| | | | | | |
|---|---|---|---|---|---|
| 4,496,216 | A | | 1/1985 | Cowan | |
| 4,636,417 | A | | 1/1987 | Rasmussen | |
| 4,652,412 | A | | 3/1987 | Chiulli | |
| 4,778,644 | A | | 10/1988 | Curro et al. | |
| 4,861,529 | A | | 8/1989 | Groebli et al. | |
| 4,886,632 | A | | 12/1989 | Van Iten et al. | |
| 5,158,819 | A | * | 10/1992 | Goodman et al. | 428/131 |
| 2,699,208 | A | | 1/1995 | Schur | |
| 5,386,752 | A | | 2/1995 | Siegel | |
| 5,637,105 | A | | 6/1997 | Tanaka et al. | |
| 5,667,864 | A | | 9/1997 | Landoll | |
| 5,681,301 | A | | 10/1997 | Yang et al. | |
| 5,702,571 | A | * | 12/1997 | Kamps et al. | 162/117 |
| 5,709,829 | A | * | 1/1998 | Giacometti | 264/156 |
| 5,861,081 | A | * | 1/1999 | Bredendick et al. | 162/114 |
| 5,863,312 | A | | 1/1999 | Wolfe | |
| 6,007,468 | A | * | 12/1999 | Giacometti | 493/341 |
| 6,176,819 | B1 | * | 1/2001 | Boegli et al. | 493/355 |
| 6,383,958 | B1 | * | 5/2002 | Swanson et al. | 442/151 |
| 6,725,512 | B2 | * | 4/2004 | Carter | 28/104 |
| 6,808,791 | B2 | * | 10/2004 | Curro et al. | 428/198 |
| 6,815,378 | B1 | * | 11/2004 | Hartgrove | 442/104 |
| 6,887,349 | B2 | * | 5/2005 | Ruthven et al. | 162/114 |
| D527,563 | S | * | 9/2006 | Contreras | D6/606 |
| 7,182,838 | B2 | * | 2/2007 | Ruthven et al. | 162/362 |
| 7,229,681 | B2 | * | 6/2007 | Boegli | 428/156 |
| 7,270,861 | B2 | * | 9/2007 | Broering et al. | 428/35.7 |
| 7,426,886 | B2 | * | 9/2008 | Spatafora | 101/23 |
| 2003/0085213 | A1 | * | 5/2003 | Burckhardt et al. | 219/243 |
| 2004/0033838 | A1 | * | 2/2004 | Hughes et al. | 470/63 |
| 2004/0126531 | A1 | * | 7/2004 | Harvey et al. | 428/43 |

FOREIGN PATENT DOCUMENTS

| | | | |
|---|---|---|---|
| EP | 1048419 | A | 11/2000 |
| GB | 1120578 | | 7/1968 |
| GB | 2329606 | | 3/1999 |
| JP | 61-084228 | A | 4/1986 |
| JP | 86-148244 | | 4/1986 |
| JP | 89-344401 | | 4/1988 |
| JP | 01-256956 | A | 10/1989 |
| JP | 07-144364 | A | 6/1995 |
| JP | 09001660 | A | 6/1995 |
| JP | 11105141 | A | 4/1997 |
| JP | 10-094357 | | 4/1998 |
| JP | 11350181 | A | 10/1998 |
| JP | 11-222257 | | 8/1999 |
| WO | 92/00798 | | 1/1992 |
| WO | 99/48653 | | 9/1999 |
| WO | 02/40250 | A1 | 5/2002 |

* cited by examiner

METHOD AND AN APPARATUS FOR PERFORATING POLYMERIC FILM

BACKGROUND OF THE INVENTION

The present invention relates to the production of perforated flexible films for packaging products.

International publication WO 02/40250 in the name of the applicant (the "International publication") discloses a method of perforating polymeric films.

The disclosure in the International publication is incorporated herein by cross-reference.

The disclosure in the International publication is not to be read as a statement of the common general knowledge in Australia or elsewhere.

The International publication discloses a number of different embodiments of tools for perforating polymeric films and a method of perforating films using the tools. The tools comprise a support substrate, for example a roll, and a series of projections extending from the plane of the substrate. The projections are formed so that, in use of the tool in the perforation method, a film of a polymeric material and the projections are brought into contact with each other so that the projections rupture the film and form suitable perforations in the film. The different embodiments of the tools are characterized by different-shaped projections, including (for example) chevron shaped, frusto-conical shaped, and V-shaped projections.

Two common applications for the perforation method, as described in the International publication are:

(a) perforating a polymeric film to change its gas or liquid transfer properties; and (b) adding a line or area of weakness in a part of a polymeric film to assist the opening or tearing of a package made from the film.

The applicant has carried out further research and development work since lodging the International publication.

The present invention is based on the findings of the further research and development work.

SUMMARY OF THE INVENTION

According to the present invention there is provided a tool for perforating a polymeric film which comprises a support substrate and a at least one projection extending from the substrate, with the projection being multi-sided In use of the tool the polymeric film is perforated by passing the film between a nip between the support substrate and another surface and bringing the film into contact with the projection and rupturing the film.

The angle theta (θ) may be between 10° and 20°.

The angle theta (θ) may be between 10° and 15°.

Preferably the projection is cross-shaped with four outwardly extending arms.

The maximum width of the projection may be between 50 and 300 um, preferably between 100 and 200 um, and more preferably between 100 and 150 um, measured at the intersections of the projection and the substrate.

The length of the side walls of the projection may be between 20 and 150 um, more preferably between 40 and 100 um, and most preferably between 40 and 60 um, measured at the intersections of the projection and the substrate.

The height of the projection from the support substrate may be between 50 and 300 um, preferably between 100 and 200 um, and more preferably between 150 and 180 um, when measured at the intersections of the projection and the substrate.

The substrate may be a surface of a roll.

The substrate may be any other suitable curved substrate or any suitable flat substrate.

The polymeric film may be a medium to high toughness polymeric film, i.e. a film that has an elongation to break of at least 50% measured in each of two mutually perpendicular directions in accordance with ASTM D882-02.

The elongation to break is used herein as a measure of toughness, with the elongation to break of at least 50% mentioned above being a lower limit of what is regarded as a medium toughness film. One such polymeric film is a PET film, for example a G2 film manufactured by Teijin Du Pont Films Japan Limited.

The film thickness may be between 12 and 23 um, although film thicknesses between 5 and 60 um are suitable for the present invention.

The tool may comprise a plurality of the projection extending from the substrate.

The projections may be spaced apart between 0.2 and 1.0 mm, preferably between 0.2 and 0.5 mm, and typically 0.3 mm, measured between the centres of the projections.

The projections may be arranged in least two lines to produce at least two lines of perforations in the film with the spacing between adjacent lines of perforations being between 0.2 and 1.0 mm, preferably between 0.2 and 0.5 mm, and more preferably around 0.3 mm.

The lines of projections may be parallel.

According to the present invention there is also provided a tool for perforating a polymeric film which comprises a support substrate and the above-described projection for forming perforations extending from the substrate.

The applicant has found that there are preferred patterns of perforations for creating a line of weakness or other types of easy open features in a polymeric film. This is a particularly important finding for example in applications where lines of weakness are required in a cross-direction of a continuous web of film.

According to the present invention there is also provided a tool for perforating a polymeric film which comprises a support substrate and a plurality of projections for forming perforations extending from the substrate, with the projections being arranged in a pattern that comprises a series of spaced-apart parallel lines of projections.

In use of the tool the polymeric film is perforated by passing the film between a nip between the support substrate and another surface and bringing the film into contact with the projections and rupturing the film.

Each projection may be as described above, i.e. multi-sided with side walls that are straight sides that are tapered upwardly and inwardly from the support substrate at an angle theta (θ) that is at least 5°, with the angle being measured in relation to imaginary lines extending perpendicularly to the substrate at the locations at which the side walls contact the substrate.

Preferably each projection is cross-shaped with four outwardly extending arms.

The projections may be arranged to achieve controlled loading and unloading of the film in the nip.

The term "controlled loading and unloading of the film in the nip" is understood herein to mean that there are no sudden changes in loading and unloading of the support substrate in the nip that are caused by the projections. This is important from an operational viewpoint because uneven load distributions across the width and along the length of the support substrate and sudden changes in loading and unloading can affect the smooth running of the machinery that contains the nip, and lead to increased noise and vibration, and higher long term maintenance costs of this machinery. Sudden loading and unloading may also shorten the operational life of the substrate and its projections.

The spacing between adjacent projections in a line, measured between the centres of the projections, may be between 0.2 and 1.0 mm, preferably between 0.2 and 0.5 mm, and typically 0.3 mm.

It is noted that all references to spacings between projections herein are understood to be centre-centre spacings.

Each line of projections may comprise a plurality of groups of projections that are spaced apart along the length of the line of projections, with each group having a plurality of spaced-apart projections and there being a spacing between the groups.

The spacing between adjacent groups of projections in a line, measured between the centres of the two closest projections, may be at least 0.6 mm, and preferably be at least 0.8 mm.

There may be two to ten projections in each group of projections. Preferably there are two to five projections in each group of projections.

The adjacent lines of projections may be arranged so that the groups of projections of one line are off-set linearly with respect to the groups of projections of an adjacent line. Consequently, the perforations in the resultant lines of perforations are off-set in a polymeric film perforated by the projections. Off-setting the groups of projections makes it possible to even out the load distribution across a nip between the support substrate and another surface in use of the tool to perforate the polymeric film.

The pattern of projections may comprise two adjacent lines of projections. The applicant has found that this pattern is preferred when a straight line (or approximately a straight line) tear in the polymeric film is required.

The pattern of projections may comprise three or more parallel lines of projections. The applicant has found that this pattern is preferred when an area of the polymeric film that can be torn easily is required.

The spacing between adjacent lines of projections may be between 0.2 and 1.0 mm, and more preferably between 0.2 and 0.5 mm, with the spacing being a centre-centre spacing between the projections. Specifically, the applicant has found that a spacing of up to 0.3 mm between lines of projections in a polymeric film forms a line of weakness that produces a clean tear in the film.

The applicant has found that it can be important not to have too many projections in an area where load is being applied to perforate a film in the nip between the support substrate and another surface, as otherwise the load being applied to each projection may be insufficient to cleanly perforate the film. Specifically, the applicant has found that a spacing of 0.2 mm is a preferred lower limit for the spacing between adjacent lines of projections.

The applicant has also found that it can be important not to have too few projections in an area where load is being applied to perforate a film in the nip between the support substrate and another surface, as the load that is required to create a clean tear in a polymeric film may become excessive. Specifically, the applicant has found that a spacing of 1.0 mm is a preferred upper limit.

The adjacent lines of projections may be in a defined area on the surface of the support substrate that forms easy open areas of perforations on the polymeric film.

The area of projections may have a leading edge (as viewed from within a nip between the support substrate and another surface) that is narrower than an average width of the area of projections so as to dampen the initial loading of the nip.

The area of projections may have a trailing edge (as viewed from within a nip between the support substrate and another surface) that is narrower than an average width of the area of projections so as to dampen the unloading of the nip as the array leaves the nip.

The area of projections may have a narrow leading edge, a wider midpoint, and a narrow trailing edge. For example, the area of projections may be formed in an octagonal shape. Other shapes may comprise diamond, hexagonal, circular, and oval, where the leading or the trailing edge of the shape is narrower than the average width of the array.

The lines of projections may extend in a direction that is transverse to, preferably perpendicular to, a travel direction of the polymeric film through a nip between the support substrate and another surface.

According to the present invention there is also provided a method of perforating a polymeric film which comprises bringing the film and the projections of the tool described above into contact with each other and rupturing the film.

The method may comprise perforating the polymeric film by passing the film between a nip between the support substrate of the tool and another surface and bringing the film into contact with the projections and rupturing the film.

The polymeric film may be a medium to high toughness polymeric film, i.e. a film that has an elongation to break of at least 50% measured in each of two mutually perpendicular directions in accordance with ASTM 882-02.

According to the present invention there is also provided a perforated film made by the above-described method.

One particular application for perforated films is in the manufacture of packaging products described as "stickpacks".

Stickpacks are used in a range of applications. One application is as packaging for particulate or powdered food products, such as coffee, sugar, and chewing gum. Stickpacks are typically formed from a film of material which is (a) folded to form a tube with opposite sides of the tube in contact with each other, (b) sealed along the sides with a seal known in the art as a "fin seal", (c) sealed at the bottom, (d) filled with the food product being packaged, and (e) sealed at the top to close the tube.

Stickpacks can be formed from any suitable material.

Polymeric and paper based materials are common examples. Alternative materials include (a) laminates of paper and polymeric material and (b) foils made from aluminium. Single and multilayer materials can be used.

Stickpacks are typically used to hold a single serve of a food product, for example a single serve of coffee. They are intended to be easily opened, and hence any features which assist the easy opening of stickpacks is useful to this type of packaging.

According to the present invention there is also provided a stickpack, comprising the above described perforated film.

According to the present invention there is also provided a stickpack made by the According to the present invention there is also provided a method of forming a stickpack that comprises perforating a polymeric film in accordance with the above-described method, folding the film to form a tube with opposite sides of the tube in contact with each other, sealing the sides, and sealing the tube at the bottom of the tube.

BRIEF DESCRIPTION OF THE DRAWINGS

The present invention is now described further by way of example with reference to the accompanying drawings, of which.

DETAILED DESCRIPTION OF THE DRAWINGS

Figure 1:
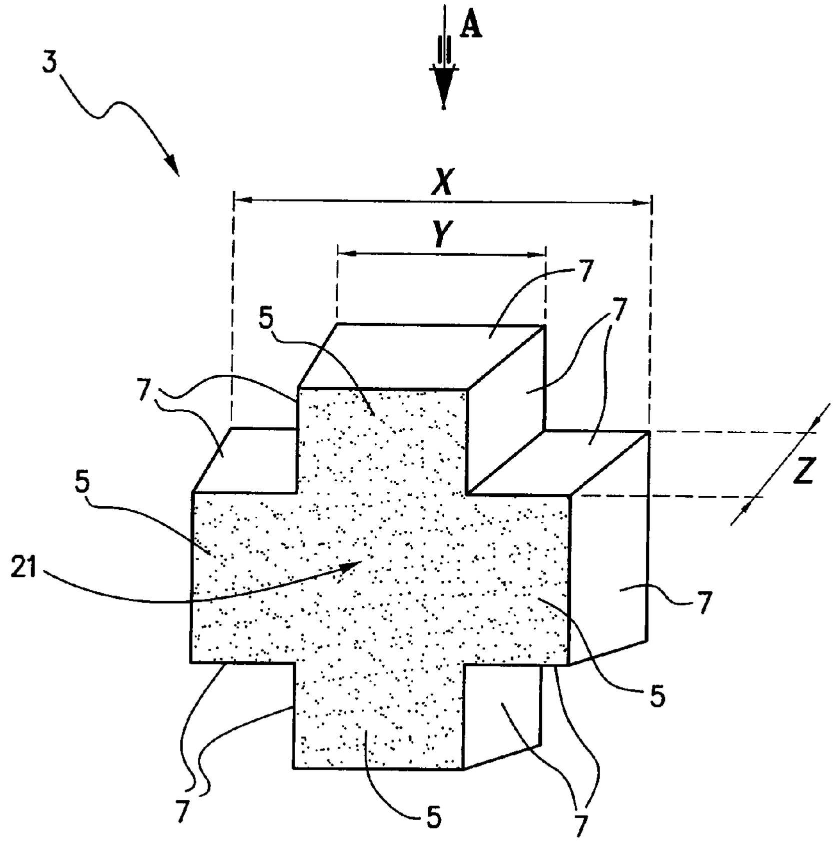
FIG. 1 is a perspective view of one embodiment of a projection that forms part of a tool for perforating a polymeric film in accordance with the present invention.
Figure 2:
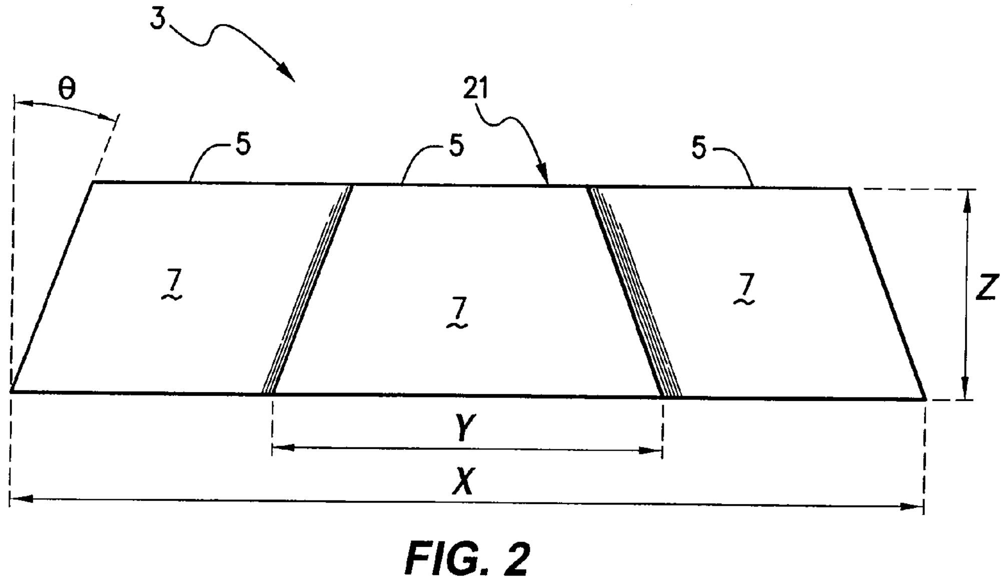
FIG. 2 is a side view of the projection shown in FIG. 1 in the direction of the arrow A in FIG. 1.

The projection 3 shown in FIGS. 1 and 2 is one of a plurality of projections on a suitable support substrate that forms a part of one embodiment of a tool for perforating a polymeric film in accordance with the present invention.

The support substrate may be a curved surface (such as a roll surface) or a flat surface. In FIGS. 1 and 2 the support substrate is the plane of each sheet of drawings.

As is described above, the projection 3 is particularly suitable for perforating medium to high toughness polymeric films, such as films that require lines or areas of weakness to allow packages made from the film to be opened. The projection may be formed on the support substrate by machining using direct laser ablation, such as described in the International publication mentioned above, or by any other suitable means.

The projection 3 is cross-shaped when viewed in top plan, with four outwardly extending arms 5. Each arm 5 comprises three flat side walls 7 that extend from the support substrate, such that the projection 3 has a total of twelve side walls 7 and a top wall 21.

With particular reference to FIG. 2, each side wall 7 is tapered upwardly and inwardly from the support substrate at an angle theta (θ) of at least 5°, with the angle being measured in relation to imaginary lines extending perpendicularly to the support substrate at the locations at which the side walls 7 contact the support substrate. One such imaginary line is shown as a dotted line in the Figure.

As is indicated above, the applicant has found in research and development work that the selection of the angle theta (θ) to be at least 5° is important in order to form perforations in medium to high toughness polymeric films.

The projection 3 has a maximum width X, measured from the base of the projection 3, of 120 um, and a height Z of 165 um. In addition, each side wall 7 has a length Y of 50 um, measured from the base of the projection 3. The applicant found in research and development work that the selection of these dimensions is important in order to form perforations in medium to high toughness polymeric films.

Figure 3:
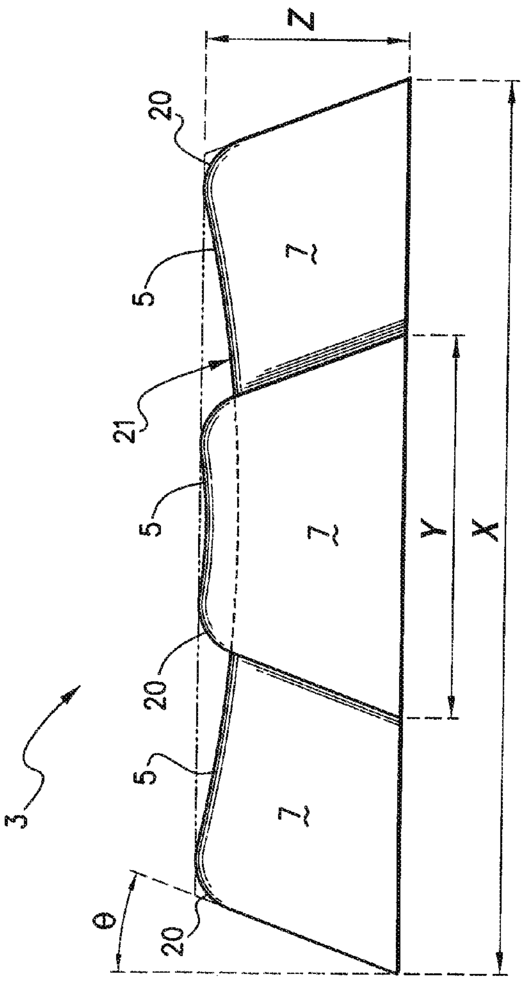
FIG. 3 is a side view of another, although not the only other, embodiment of a projection that forms part of a tool for perforating a polymeric film in accordance with the present invention, with the projection having a concave surface in a top wall of the projection.

FIG. 3 shows another embodiment of a projection 3 in accordance with the present invention. The projection 3 has a top wall 21 that is slightly concave in a central section of the top wall. The projection 3 also has rounded edges 20 at the outer margin of the side wall 7.

Figure 4:
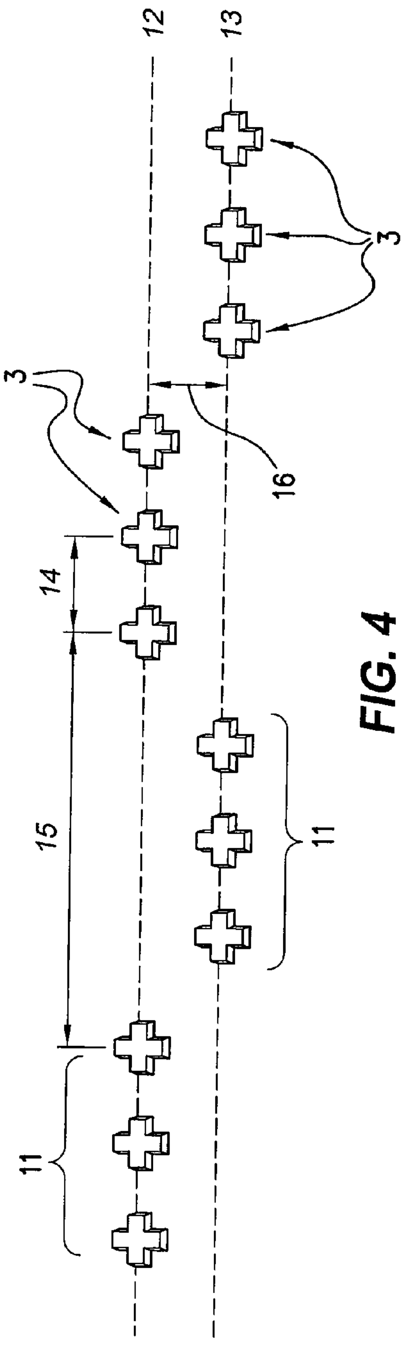
FIG. 4 is a plan view of one embodiment of a pattern of a plurality of the projection shown in FIG. 1 positioned on a support substrate in accordance with the present invention, with the pattern of projections being suitable for creating lines of weakness in a polymeric film.

FIG. 4 shows one embodiment of a pattern of a plurality of the projection 3 shown in FIG. 1 extending from a support substrate (the plane of the drawing sheet). The pattern is particularly suitable for forming a line of weakness in a polymeric film.

The pattern comprises two parallel lines 12 and 13 of the projection 3.

Each parallel line 12, 13 of the projection 3 comprises a plurality of groups 11 of the projections 3, and each group 11 comprises three individual projection 3 that are closely spaced apart in the line. Each projection 3 in a group 11 is spaced apart from its closest neighbour by a distance 14, which is 0.3 mm measured between the centres of the projections 3 in this example. Each group 11 of projections 3 in a line 12, 13 is separated from an adjacent group 11 of projections in the line by a distance 15, of about 1.2 mm measured between the centres of the projections 3 in this example. The two parallel lines 12, 13 are spaced apart by a distance 16 of 0.4 mm measured between the centres of the projections 3 in the lines in this example.

Figure 5:
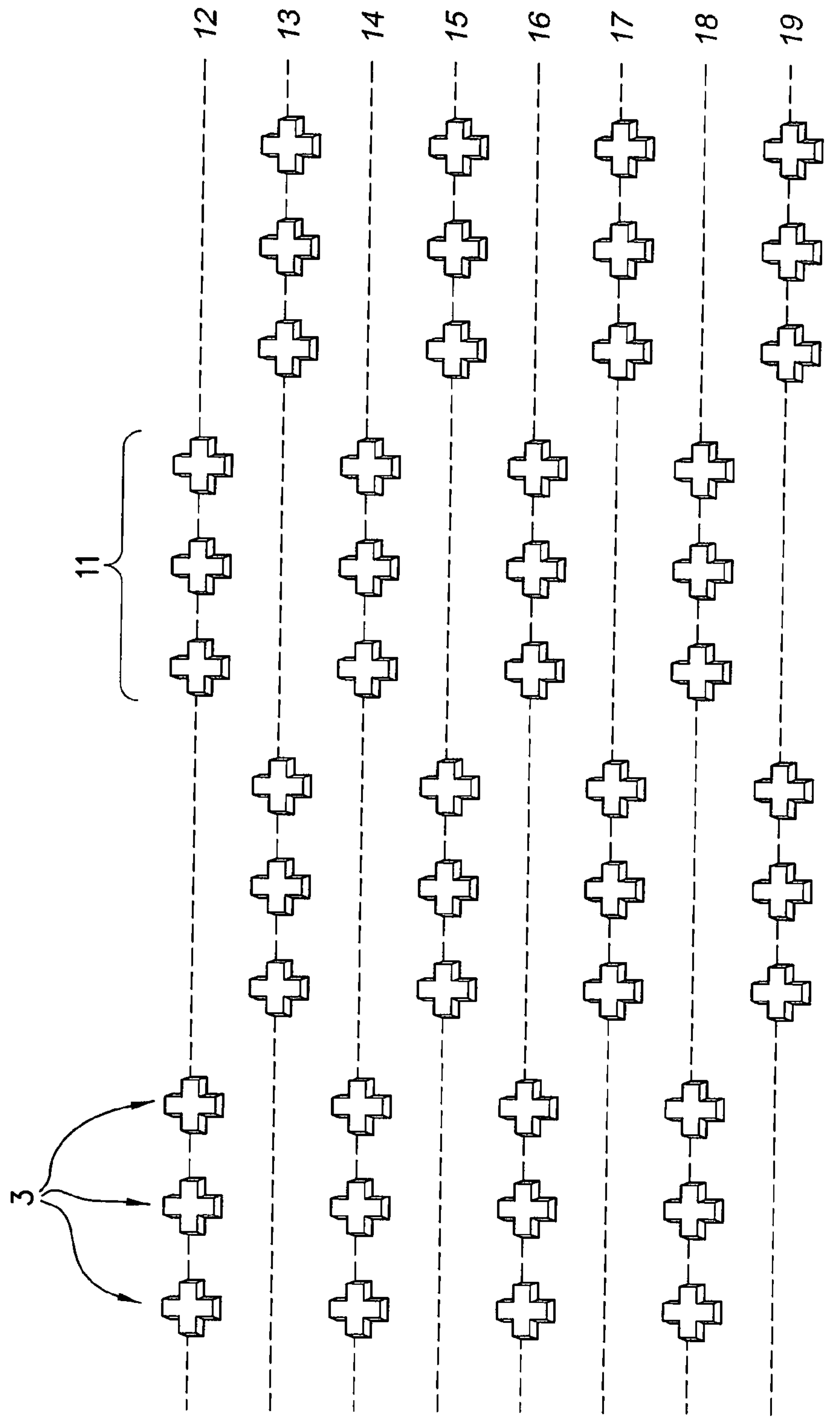
FIG. 5 is a plan view of another, although not the only other, embodiment of a pattern of a plurality of the projection shown in FIG. 1 positioned on a support substrate in accordance with the present invention, with the pattern of projections being suitable for creating areas of weakness in a polymeric film.

FIG. 5 shows another pattern of a plurality of the projection 3 shown in FIG. 1 extending from a support substrate. The pattern is particularly suitable for forming an area of weakness in a polymeric film.

The pattern comprises two parallel lines 12 and 13 of the projection 3 shown in FIG. 4 that are repeated four times in this example. The repeated pairs of lines are identified by the pairs of numerals 14/15; 16/17; and 18/19.

A polymeric film can be perforated to form lines or areas of weakness in the film by bringing the film and the projections of the tools described above into contact with each other and rupturing the film via the projections.

For example, in a situation in which the support surface is a surface of a roll, the method comprises perforating a polymeric film by passing the film between a nip between the support substrate and another roll, such as a backing roll having an outer surface made from rubber, with the other roll applying a load to the film and bringing the film into contact with the projections as it passes through the nip and rupturing the film in the nip. This method is described in the International publication mentioned above.

Figure 6:
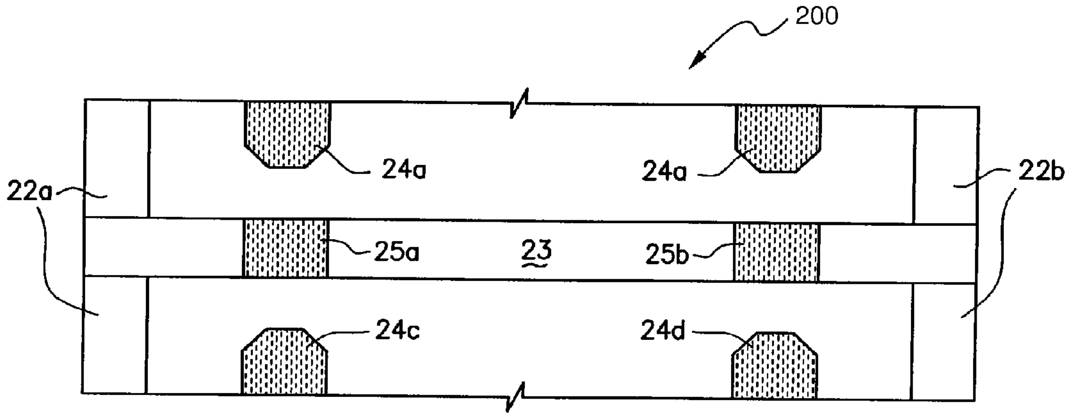
FIG. 6 is a plan view of one embodiment of a stickpack having perforated areas in accordance with one embodiment of the present invention.

FIG. 6 shows a plan view of a stickpack 200 made in accordance with one embodiment of the present invention. The plan view of FIG. 6 shows one half of the stickpack as it would appear when viewed from above.

The stickpack 200 shown in FIG. 6 is made from a perforated polymeric film that is formed into a tube with a fin seal 23 running along the length of the stickpack and two end seals **22*a* and 22*b*** at opposite ends of the stickpack.

It can be appreciated that the other half of the stickpack 200 that is not shown in FIG. 6 is behind the view that is shown in the drawing. The half of the stickpack that is not shown comprises a flat surface bounded at its two ends with the end seals 22*a* and 22*b*.

FIG. 6 shows that the stickpack 200 has perforations that are arranged in specific selected areas that form easy open features of the stickpack in accordance with the present invention. There are such easy open edge areas 24*a*, 24*b*, 24*c*, 24*d* 25*a*, and 25*b*. Although not shown in the drawing, the easy open areas 24*a* to 24*d* are mirrored on the other side of the stickpack.

This stickpack can be opened by tearing the stickpack at any of the easy open areas 24*a* to 24*d* and 25*a* and 25*b*. Once the tear has commenced, the tear will then travel through the easy open areas close to these tear areas, i.e. a tear initiated in area 24*a* will likely travel through area 25*a* and 24*c*.

Figure 7:
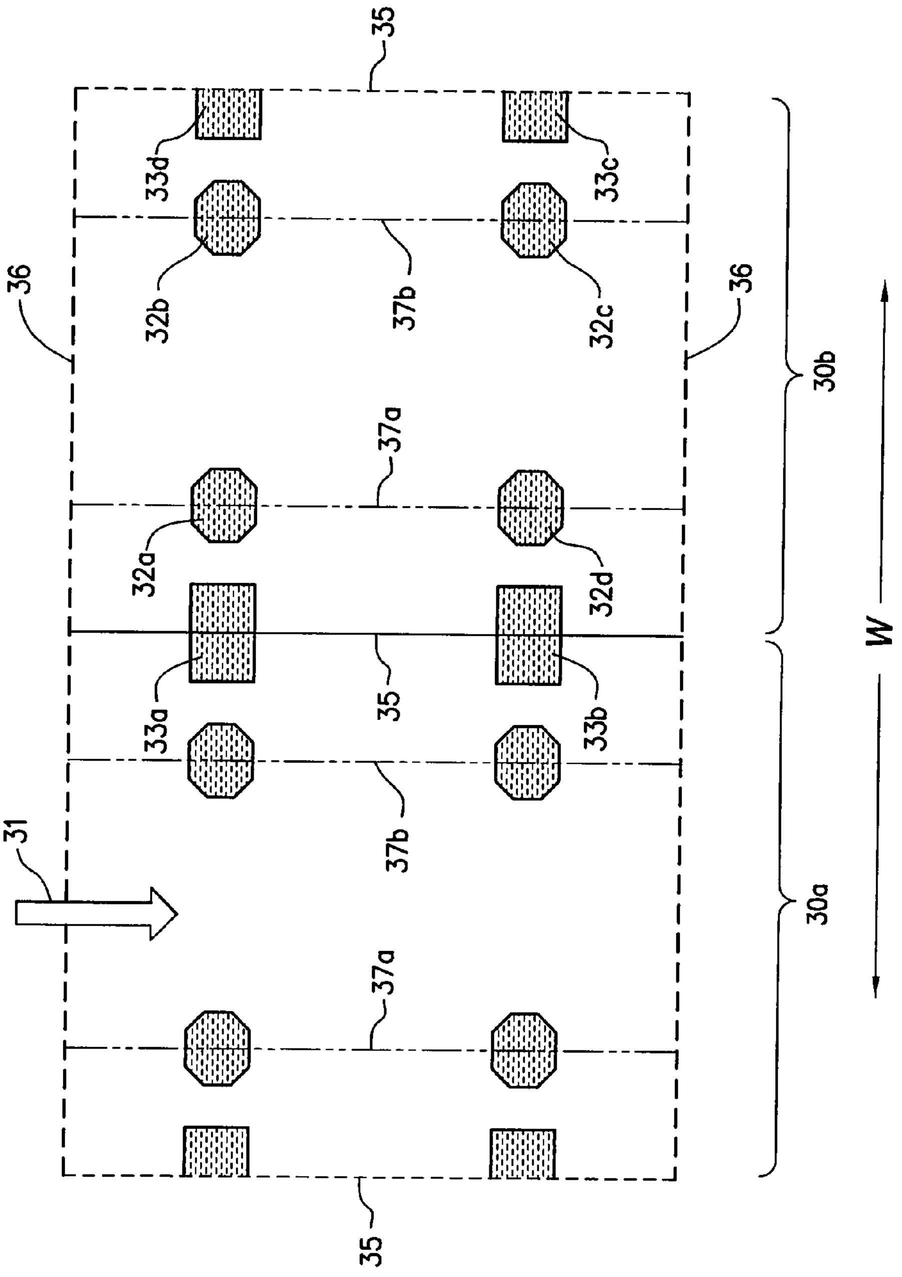
FIG. 7 is a plan view of one embodiment of a length of a polymeric film in accordance with the present invention that has areas of perforations in the film that are suitable for forming the stickpack shown in FIG. 6.

FIG. 7 shows two adjacent areas of a length of perforated polymeric film that can form two of the stickpack 200 shown in FIG. 6. These adjacent areas are shown in side by side relationship across a part of the width W of the film and are the areas identified by the numerals 30*a* and 30*b* in the Figure. The two areas may be two of a plurality of areas across the width of the film, with only these two areas being illustrated to simplify the drawing. The perforated film is formed, for example, by passing an unperforated film through a nip between a first roll that has a suitable pattern of the projection 3 described above on the surface of the roll and a backing roll, such as a backing roll having an outer surface formed from rubber, with the backing roll applying a load to the film in the nip. The direction of movement of the polymericfilm through the nip is shown by the arrow 31 in FIG. 3. Each of the areas 30*a* and 30*b* has four octagonal areas that are marked on area 30*b* as the areas 32*a*, 32*b*, 32*c* and 32*d*. These octagonal areas are divided by lengthwise extending fold lines 37*a* and 37*b*. Each of the areas 30*a* and 30*b* has fin seal areas 33*a*, 33*b*, 33*c*, and 33*d*. The edges of the two areas 30*a* and 30*b* are defined by transverse cutting lines 36 and lengthwise extending cutting lines 35. The lengthwise extending cutting lines 35 dissect the perforated fin seal areas 33*a* and 33*b*. The fin seal easy open areas 33*a* and 33*b* are formed in a rectangular shape to provide a maximum frontal area for a tear which is initiated in the easy open edge areas 24 and then travels through to the fin seal areas 25.

Figure 8:
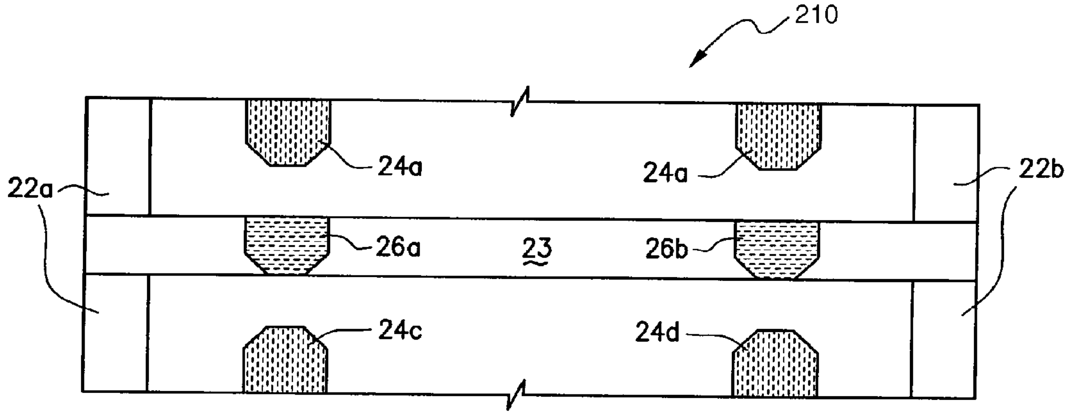
FIG. 8 is a plan view of another, although not the only, other embodiment of a stickpack having perforated areas in accordance with one embodiment of the present invention.

FIG. 8 shows a plan view of a stickpack made in accordance with another embodiment of the present invention. The stickpack 210 shown in FIG. 8 is similar to the stickpack 200 shown in FIG. 6 and the same reference numerals are used to describe the same features. The main difference between the two embodiments is that the fin seal easy open areas 26*a* and 27*a* are formed in a half octagonal shape rather than as a square shape as shown in FIG. 6.

Figure 9:
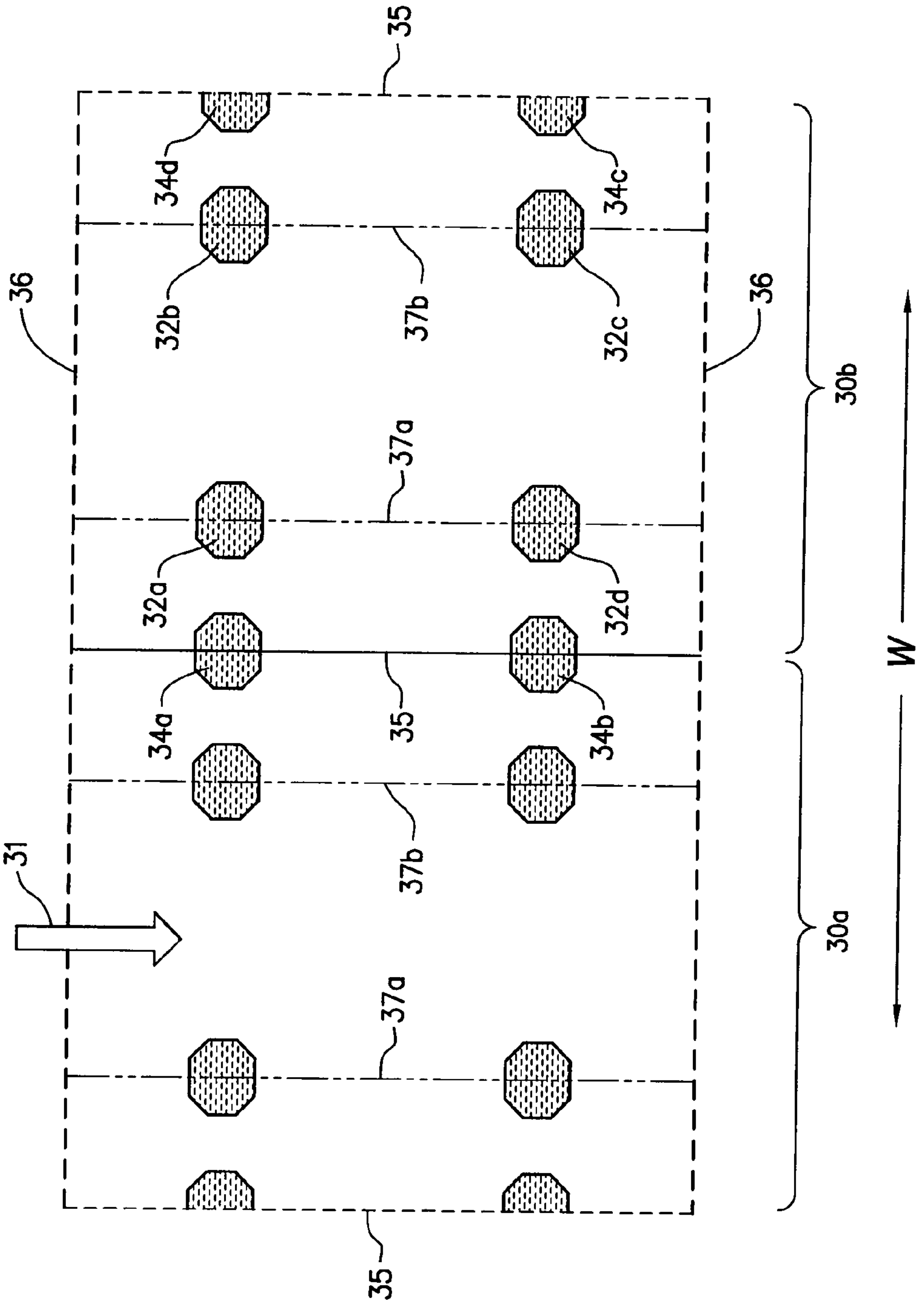
FIG. 9 is a plan view of another, although not the only other embodiment of a length of polymeric film in accordance with the present invention that has areas of perforations in the film that are suitable for forming the stickpack shown in FIG. 8.

FIG. 9 shows two adjacent areas of a perforated polymeric film that can form two of the stickpack 210 shown in FIG. 8. These adjacent areas are side by side across a part of the width W of the film and are the areas identified by the numerals 30*a* and 30*b* in the Figure. As is the case with the embodiment shown in FIG. 7, the two areas may be two of a plurality of areas across the width of the film, with the two areas only being illustrated to simplify the drawing. In addition, as is the case with the embodiment shown in FIG. 7, the perforated film is formed, for example, by passing an unperforated film through a nip between a first roll that has a suitable pattern of the projection 3, as described above, on the surface of the roll and a backing roll, with the backing roll applying a load to the film in the nip. The direction of movement of the polymeric film through the nip is shown by the arrow 31 in the Figure. Each of the areas 30*a* and 30*b* has four octagonal areas of a plurality of the projection 3 that are marked on area 30*b* as the areas 32*a*, 32*b*, 32*c* and 32*d*. These octagonal areas are made up of adjacent lines of the projection 3. These octagonal areas are divided by lengthwise extending fold lines 37*a* and 37*b*. Each of the areas 30*a* and 30*b* has fin seal areas 34*a*, 34*b*, 34*c*, and 34*d* of the projection 3. The edges of the two areas 30*a* and 30*b* are defined by transverse cutting lines 36 and lengthwise extending cutting lines 35. The lengthwise extending cutting lines 35 dissect the perforated fin seal areas 33*a* and 33*b*. The fin seal easy open areas 34*a* and 34*b* are formed in an octagonal shape to provide a maximum frontal area for a tear which is initiated in the easy open edge areas 24 and then travels through to the fin seal areas 25.

In use, as a new array of the projection 3 on a roll that has projections extending from the roll rotate to enter a nip between the roll and a backing roll with the backing roll applying load to a film in the nip, the projections will cause a small increase in the mechanical loading of the nip. Similarly as each area of projections leaves the nip the projections will slightly lower the mechanical loading of the nip. There will be a cyclic loading and unloading of the nip, imparting an additional vibration to the machine. However, forming the projections in patterns that produce the areas of projections shown in FIGS. 7 and 9, with a narrower leading edge such as that seen in the octagonal perforation areas 32*a*, 32*b*, 32*c*, and 32*d*, the initial additional loading of the nip is reduced. As the width the areas of projections increases in the direction of movement of the projections (and the film) through the nip, the load increases in a controlled way, i.e. without a sudden increase. The reverse happens when the octagonal areas of projections such as areas 32*a*, 32*b*, 32*c*, and 32*d* leaves the nip. In practice, the use of octagonal areas of projections leads to smoother running of the perforating machine.

The octagonal areas of projections may also help to guide a tear path when a stickpack 210 is opened. The stickpack is normally torn at one of the sides in the marked easy open areas, and once started the tear continues to the fin seal 23. Since the fin seal 23 is formed by adhering the film together which will increase the tear strength of the laminated fin seal, the additional easy open areas 33 or 34 are required to ensure that the tear travels through the fin seal as well.

Figure 10:
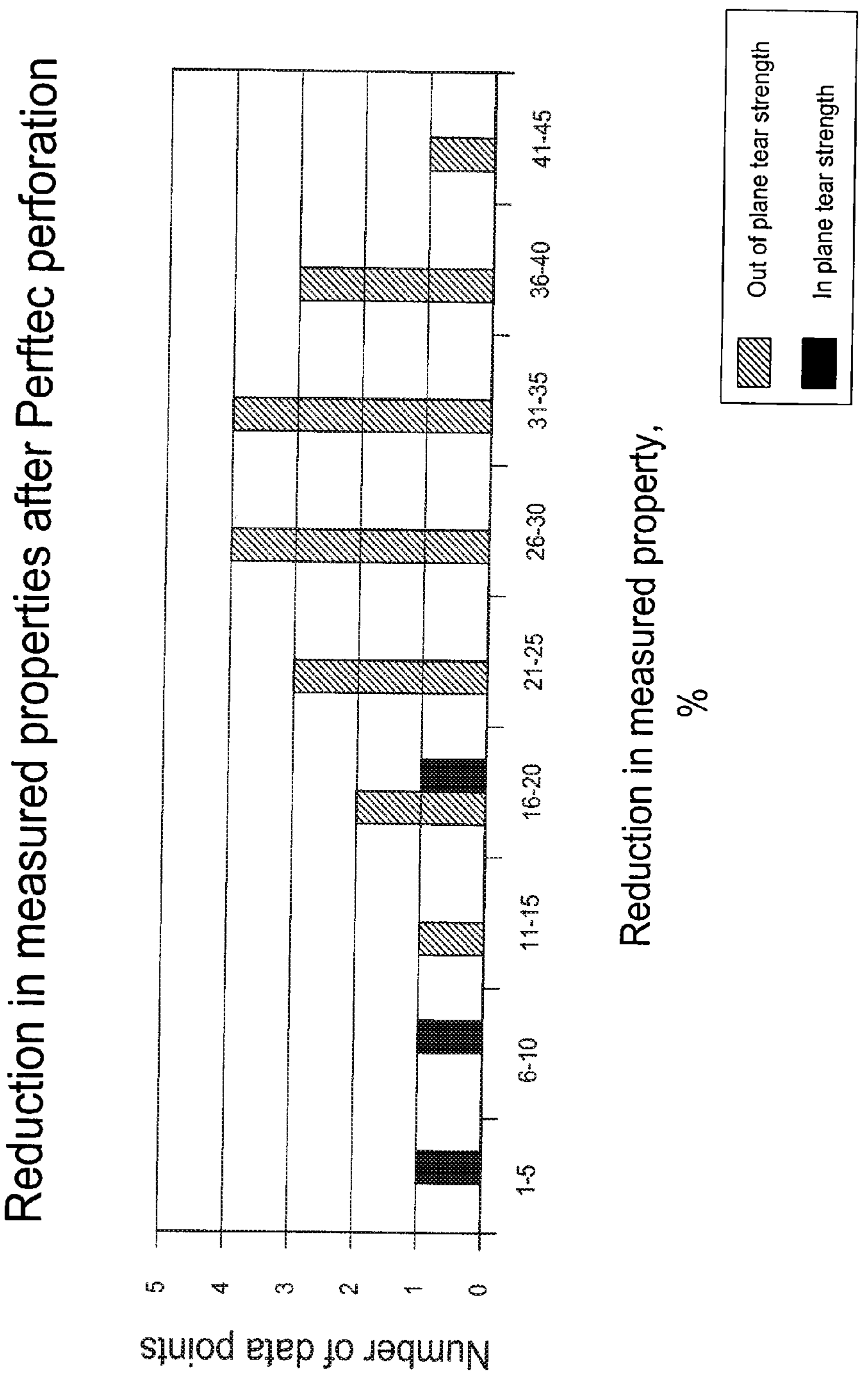
FIG. 10 is a graph of representative tear and tensile data after the application of one embodiment of a method of perforating polymeric film in accordance with one embodiment of the present invention.

FIG. 10 shows representative tear and tensile data after the application of the perforation method described in one embodiment of the present invention. FIG. 10 shows that the out-of-plane tear strength of a range of polymeric films perforated using one embodiment of the method in the present invention is reduced by approximately between 25 and 35%, but the in-plane tensile strength is only reduced by a maximum of 20%. The polymeric films used to the produce these results include metallised and unmetallised polymer laminates (mainly formed from PET film), and range between around 7 um and 9 um in thickness. The out-of-plane tearing method used was a proprietary method using a 1 kN load cell tearing the film perforated with a 16 mm wide tear strip at a speed of 1500 mm/min. The in-plane tensile method used was a variation of ASTM D882 where 25 mm long sample was pulled at either 50 or 500 m/min with a 100 N load cell. However the exact method used is not that important as is the ratio of strengths measured with either of these methods that is important.

These are important results. Retaining in-plane tensile strength is important as this will ensure the stickpack will not fail during the manufacturing, filling or subsequent handling of the stick packs. Lowering out of plane tear strength is important as this helps ensure that the stickpack is easy to tear open.

Many modifications may be made to the embodiments of the present invention described above without departing from the spirit and scope of the invention.

The invention claimed is:

1. A tool for perforating a polymeric film which comprises a support substrate and a plurality of projections for forming perforations extending from the substrate, with the projections being arranged in a pattern that comprises a series of spaced-apart parallel lines of projections in defined spaced-apart areas on the surface of the support substrate, with these areas being separated by areas of the substrate that have no projections in the areas, wherein at least one area of projections is arranged to achieve controlled loading and unloading of the film in a nip between the support substrate and another surface in use of the tool to perforate a polymeric film by having a leading edge as viewed from within the nip that is narrower than an average width of the projections in the area so as to dampen an initial loading of the nip, wherein the width of the area increases from the leading edge to a wider part of the area, with the projections being cross-shaped with four outwardly extending arms having side walls that have straight sides that are tapered upwardly and inwardly from the support substrate at an angle theta (θ) that is at least 5°, with the angle being measured in relation to imaginary lines extending perpendicularly to the substrate at the locations at which the side walls contact the substrate.

2. The tool defined in claim 1 wherein the angle theta (θ) is between 10° and 20°.

3. The tool defined in claim 1 wherein the maximum width of the projections is between 50 and 300 μm.

4. The tool defined in claim 1 wherein the length of the side walls of the projections is between 20 and 150 μm.

5. The tool defined in claim 1 wherein the height of the projections from the support substrate is between 50 and 300 μm.

6. The tool defined in claim 1 wherein each line of projections comprises a plurality of groups of projections that are spaced apart along the length of the line of projections, with each group having a plurality of spaced-apart projections and there being a spacing between the groups.

7. The tool defined in claim 6 wherein the adjacent lines of projections are arranged so that the groups of projections of one line are off-set linearly with respect to the groups of projections of an adjacent line.

8. The tool defined in claim 1 wherein the pattern of projections comprises two adjacent lines of projections.

9. The tool defined in claim 8 wherein the spacing between the adjacent lines of projections is between 0.2 and 1.0 mm.

10. The tool defined in claim 1 wherein the pattern of projections comprises three or more parallel lines of projections.

11. The tool defined in claim 1 wherein at least one area of projections comprises a trailing edge (as viewed from within a nip between the support substrate and another surface) that is narrower than an average width of the projections in the area so as to dampen the unloading of the nip as the array leaves the nip.

12. The tool defined in claim 1 wherein each area of projections comprises a narrow leading edge, a wider midpoint, and a narrow trailing edge.

13. A method of perforating a polymeric film which comprises bringing the polymeric film and the projections of the tool defined in claim 1 into contact with each other and rupturing the film.

14. The method defined in claim 13 wherein the polymeric film is a medium to high toughness polymeric film is a film that has an elongation to break of at least 50% measured in each of two mutually perpendicular directions in accordance with ASTM 882-02.

15. A perforated film made by the method defined in claim 13.

16. A stickpack comprising the perforated film defined in claim 15.

17. A method of forming a stickpack that comprises perforating a polymeric film in accordance with the method defined in claim 13, folding the film to form a tube with the same sides of the tube in contact with each other, sealing the sides, and sealing the tube at the bottom of the tube.

* * * * *